Figure 8:
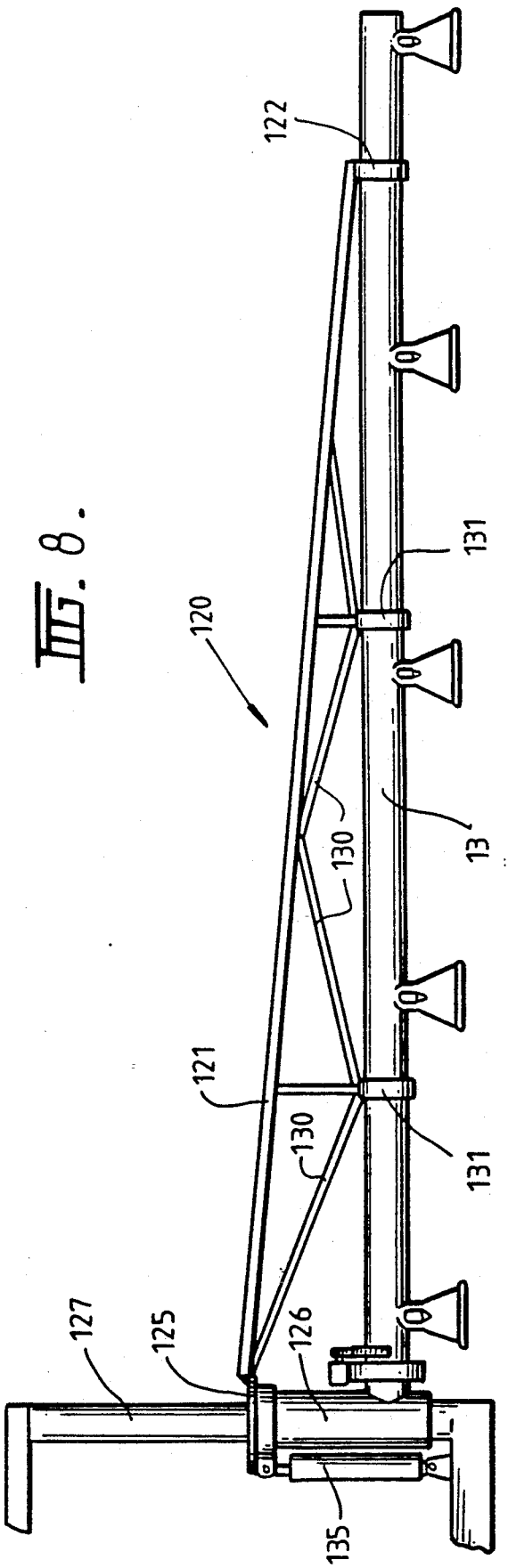

United States Patent [19]

Sartor

[11] Patent Number: 5,176,322
[45] Date of Patent: Jan. 5, 1993

[54] CROP-SPRAYING APPARATUS

[76] Inventor: Giuseppe M. Sartor, P.O. Box 181, Bourke, Australia

[21] Appl. No.: 721,754

[22] Filed: Jun. 26, 1991

Related U.S. Application Data

[63] Continuation of Ser. No. 328,155, Mar. 31, 1989, abandoned.

[30] Foreign Application Priority Data

Aug. 29, 1986 [AU] Australia .............................. PH7741

[51] Int. Cl.$^5$ .......................... B05B 1/26; B05B 1/20; B05B 3/12
[52] U.S. Cl. ...................................... 239/77; 239/159; 239/168; 239/175; 239/176
[58] Field of Search ................... 239/77, 78, 176, 175, 239/172, 168, 166, 164, 159; 285/281

[56] References Cited

U.S. PATENT DOCUMENTS

| | | | |
|---|---|---|---|
| 2,226,136 | 12/1940 | Parker | 239/77 |
| 2,297,110 | 9/1942 | Parker | 239/77 |
| 3,472,454 | 10/1969 | Blue et al. | 239/77 |
| 3,581,993 | 6/1971 | Reams | 239/168 X |
| 3,804,332 | 4/1974 | Welch | 239/77 |
| 3,807,676 | 4/1974 | Bieker et al. | 239/167 X |
| 3,850,454 | 11/1974 | Paddington | 285/281 X |
| 4,927,080 | 5/1990 | Alsing | 239/77 |
| 4,982,898 | 1/1991 | Ballu | 239/77 |

FOREIGN PATENT DOCUMENTS

| | | |
|---|---|---|
| A14546/83 | 5/1983 | Australia . |
| 3321615A1 | 12/1984 | Fed. Rep. of Germany . |
| 2416737 | 2/1978 | France . |
| 1425162 | 2/1976 | United Kingdom . |
| 1435999 | 5/1976 | United Kingdom . |
| 2100962 | 1/1983 | United Kingdom . |
| 2110062 | 6/1983 | United Kingdom . |
| 2149281A | 6/1985 | United Kingdom . |
| 2170981A | 8/1986 | United Kingdom . |
| 87/01909 | 4/1987 | World Int. Prop. O. . |
| 8801539 | 3/1988 | World Int. Prop. O. ............ 239/77 |

*Primary Examiner*—Andres Kashnikow
*Assistant Examiner*—Lesley D. Morris
*Attorney, Agent, or Firm*—Arnold, White & Durkee

[57] ABSTRACT

A device for spraying liquid onto a crop with the assistance of directed air streams. Air is impelled into a central air chamber, through left and right hollow swivelling joints along extended air booms to pass out through outlet funnels. Associated with each outlet funnel is a spray nozzle which directs spray liquid into the outgoing air stream. The extended booms can be pivoted to a trailing position behind the device. The flattened outlet funnels together with the positioning of the nozzles provided an enhanced, directed atomized spray.

6 Claims, 7 Drawing Sheets

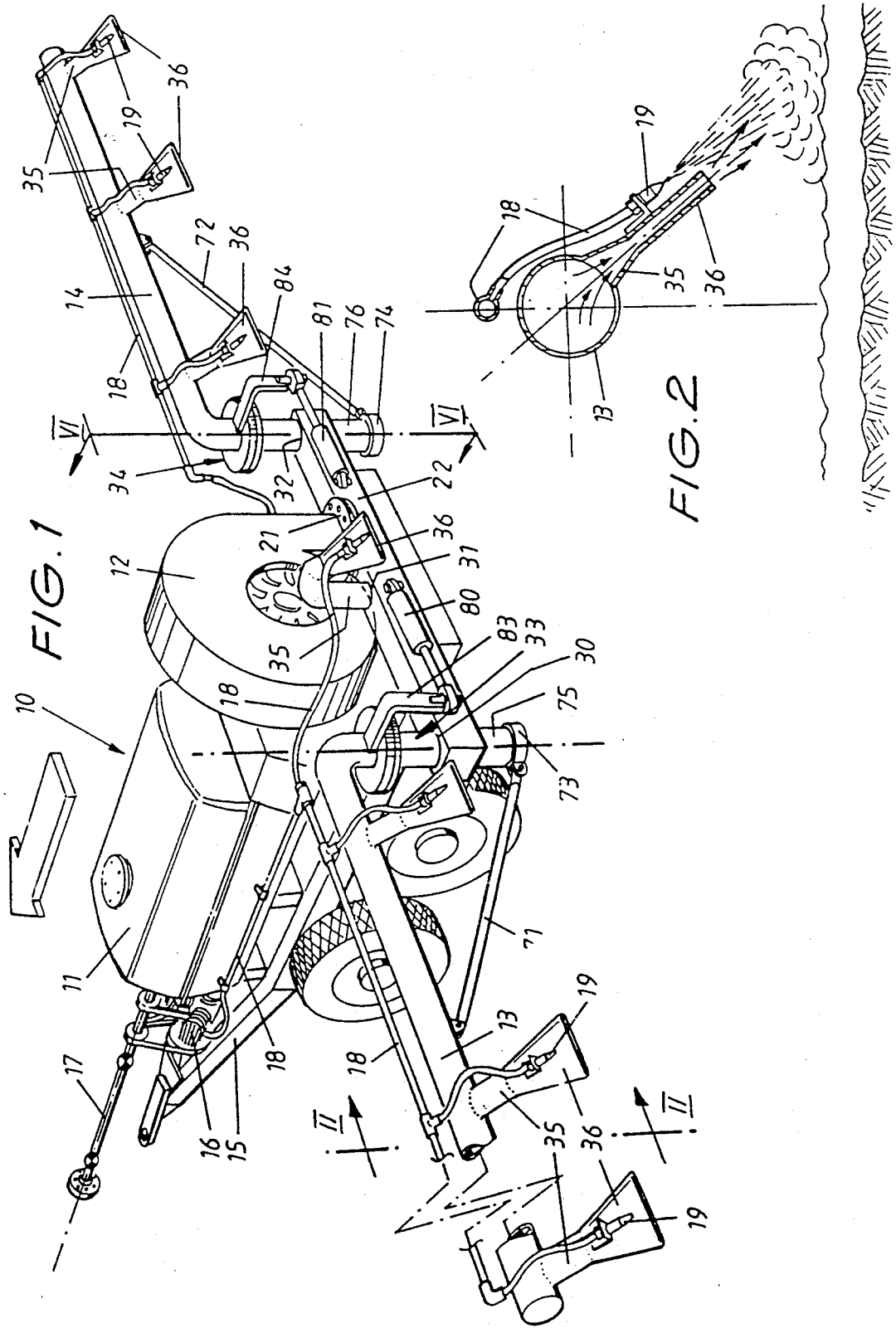

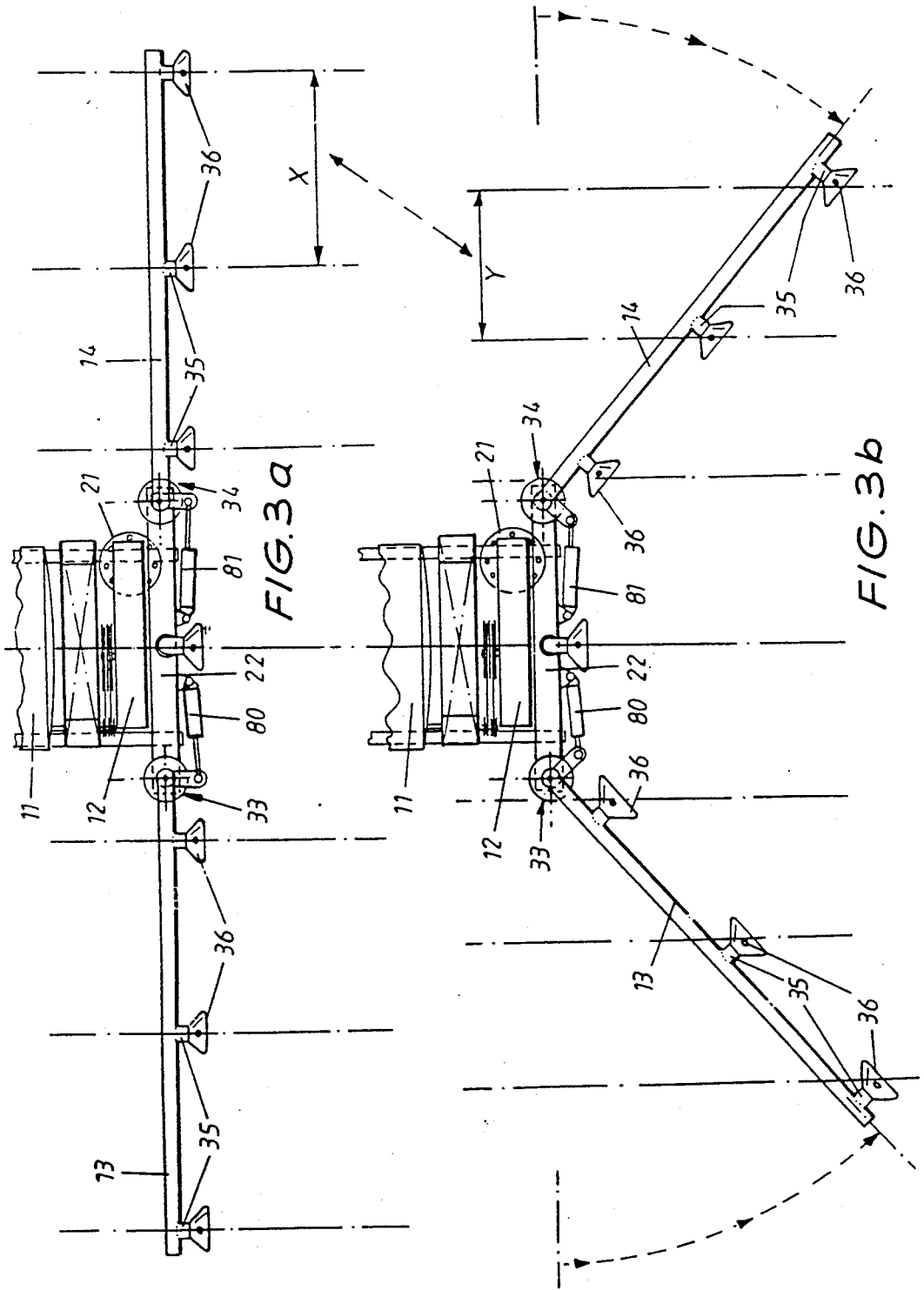

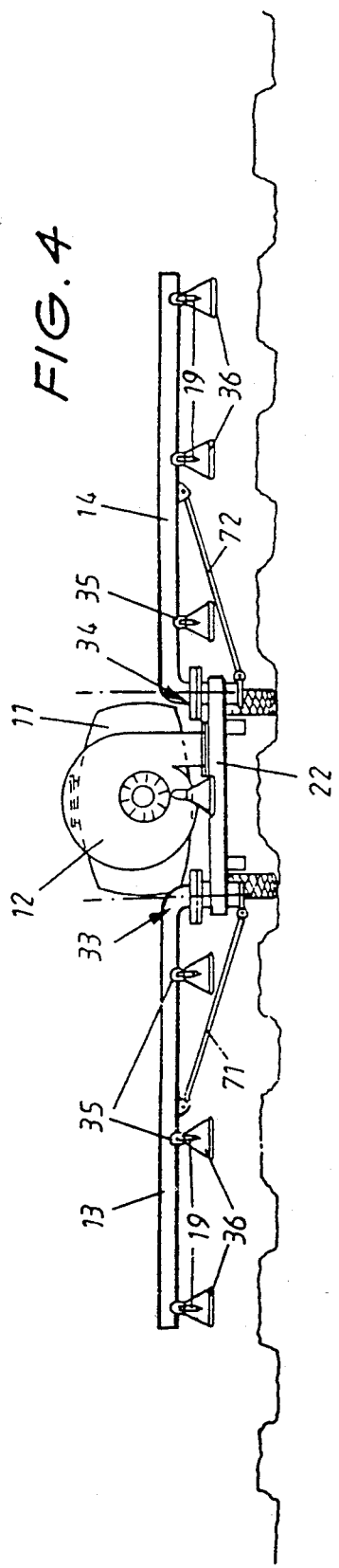
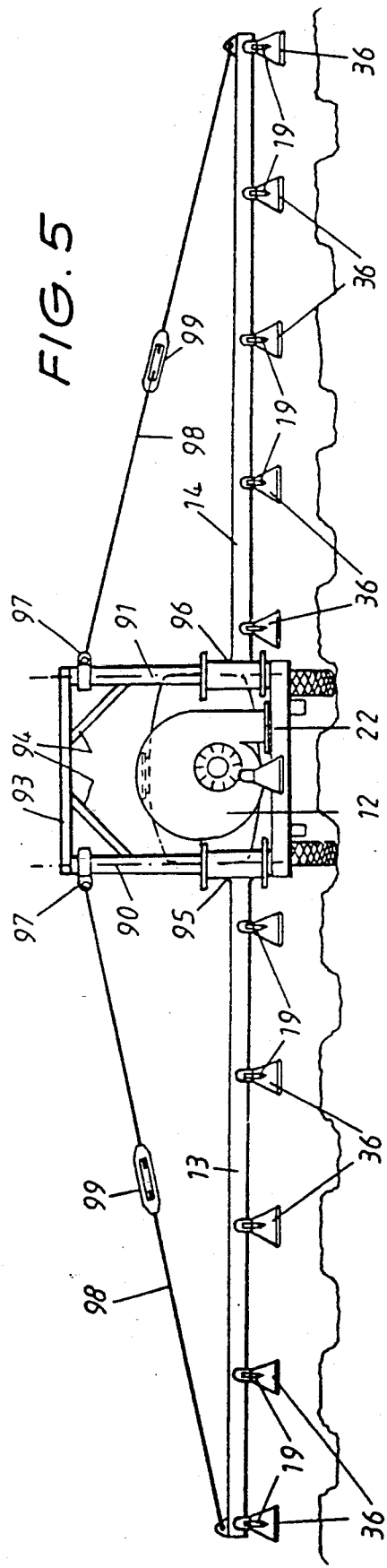

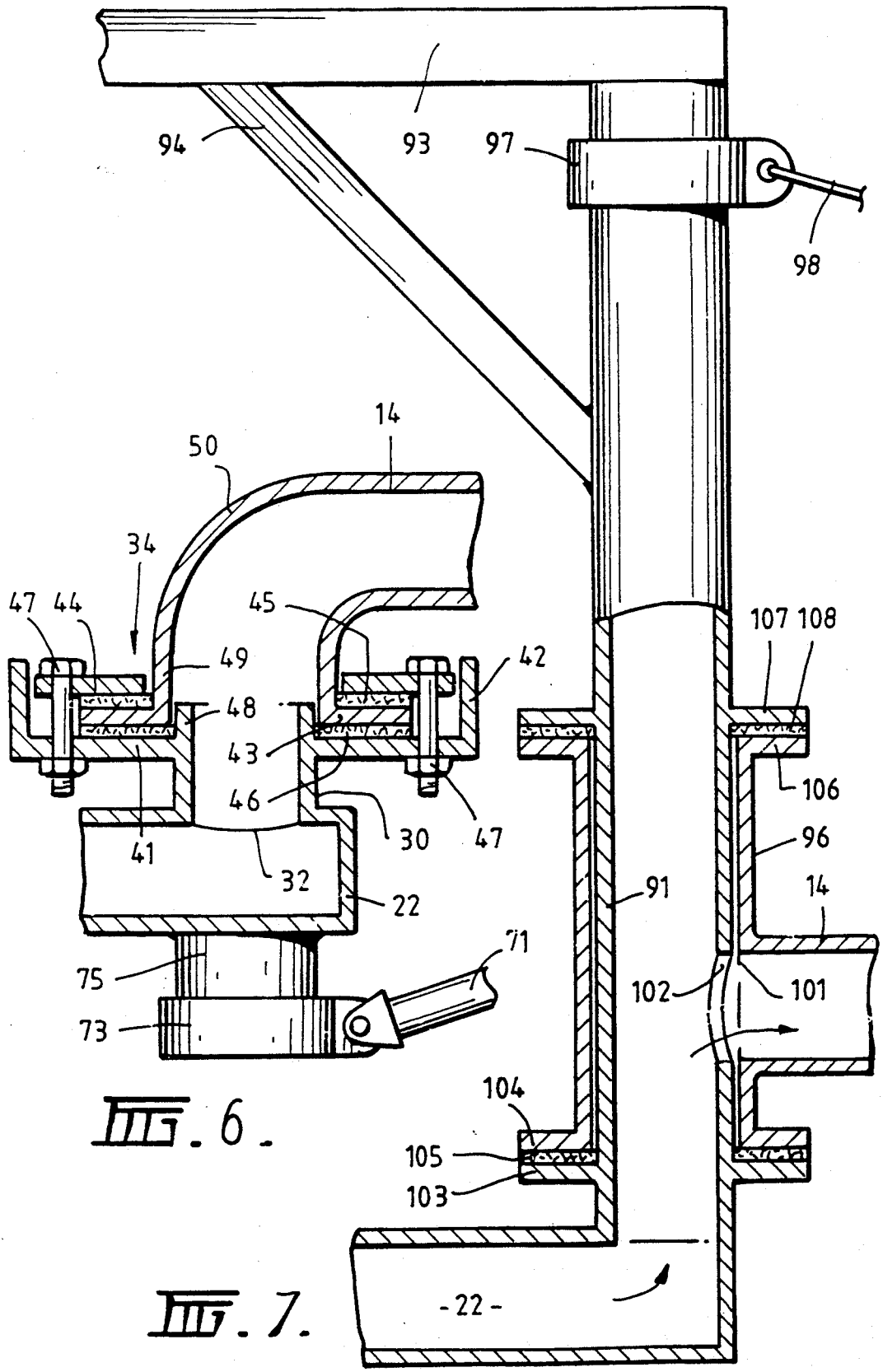

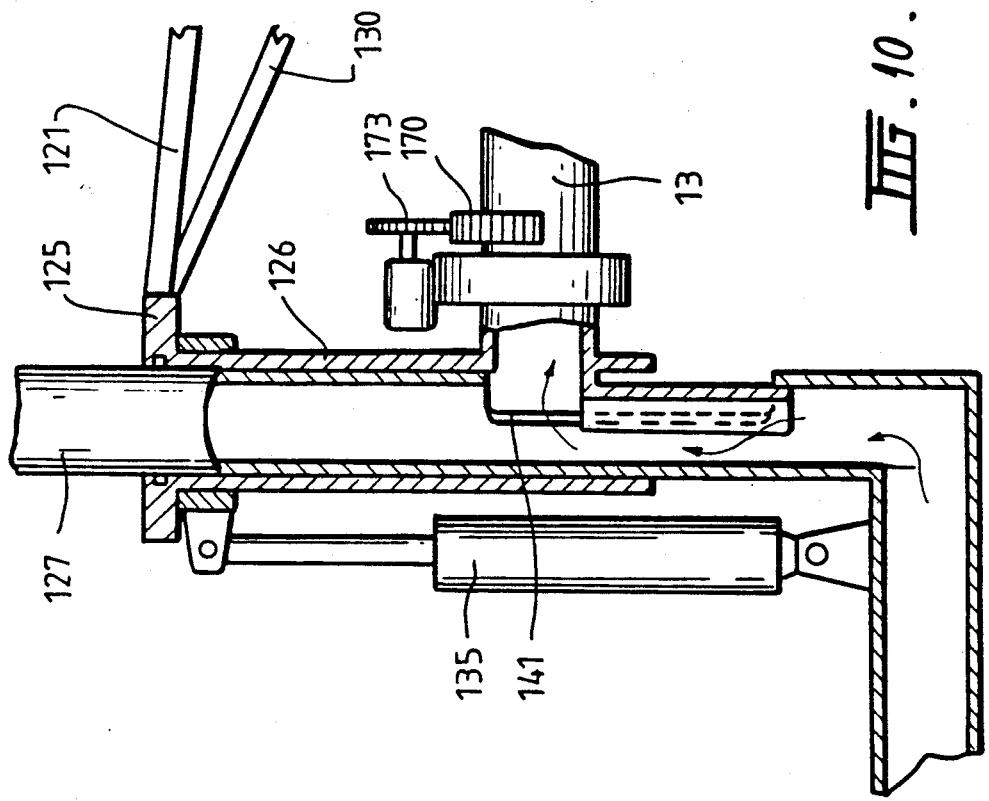
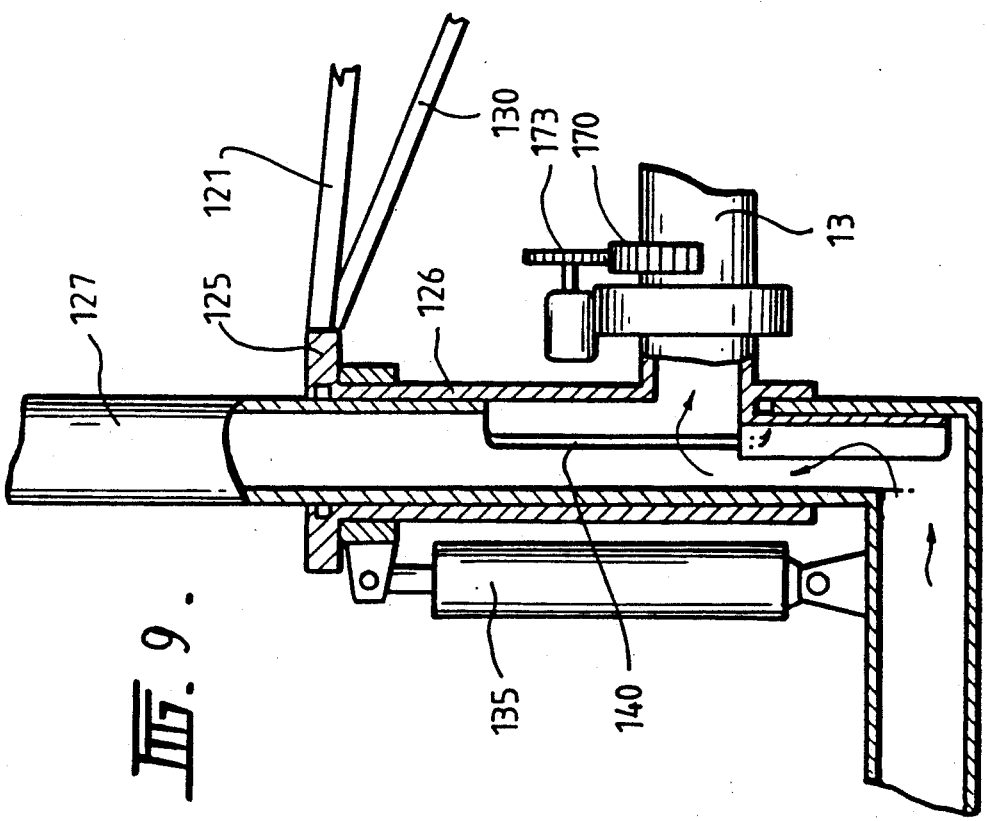

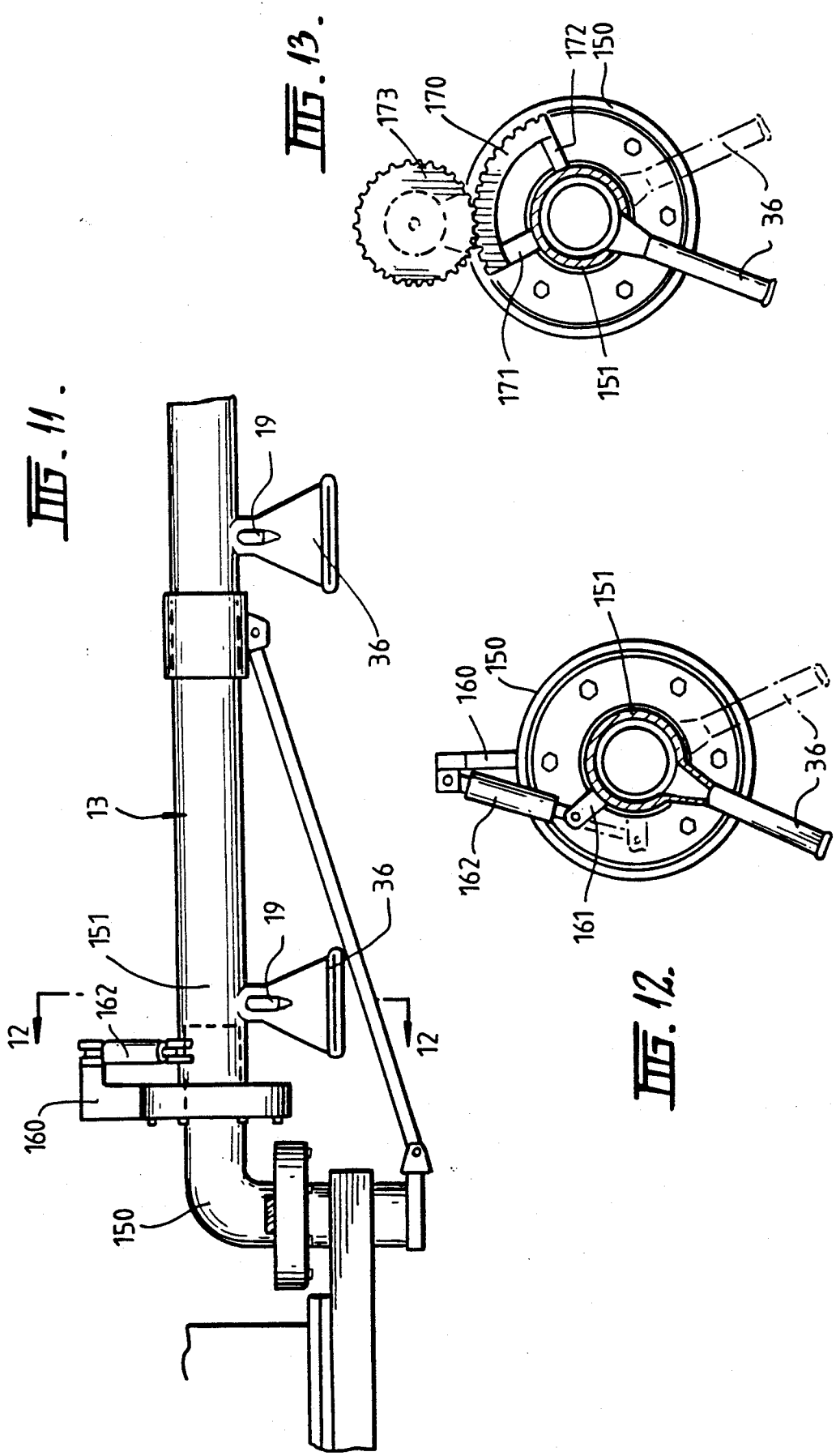

CROP-SPRAYING APPARATUS

This application is a continuation of copending U.S. patent application Ser. No. 07/328,155, filed Mar. 31, 1989, now abandoned, which was the U.S. National stage of PCT/AU87/00180 filed on Jun. 24, 1987.

The invention relates to crop-spraying apparatus and has particular, but not exclusive, reference to apparatus for spraying ground crops with the assistance of directed air streams. Such apparatus may be mounted on a trailer to be towed, mounted directly on the rear of a tractor, or otherwise conveyed over the crops to be sprayed. The apparatus may be used for spraying crops with water, fertilizer, insecticide, weedicide, or other agricultural chemicals.

It is well known in the art to construct crop-spraying machines with extended booms or frames which carry a series of spray outlets. The booms or frames are generally only structural members which support separate spray systems, although a conduit for spray fluid may form one element of a cantilevered framework, and an extended boom may itself be the conduit for spray fluid.

It is clearly desirable for these extended booms or frames to have a broad span, to allow for greater coverage for each pass of the machine, while providing for the span to be reduced to facilitate transportation and storage of the equipment. A number of configurations have been proposed with booms or frames of broad span in an extended state, and with provision for these extended members to be folded or collapsed on several joints, or swung inward from the extended state on a single pivot.

U.S. Pat. 3,807,676 discloses an arrangement for booms mounted on a spray vehicle to act as supports for a separate spray system. Booms extend from either side of a vehicle, being pivotally mounted to a rack on the rear of the vehicle. The boom may be swung forward from the transverse, extended spraying position to a stowed position parallel to the vehicle by means of hydraulic rams.

In British Patent 1425162, a spray line is housed within a channel member forming part of a framework extending either side of a central mounting rack. The extended frameworks are universally jointed to the rack to allow them to swing to a limited extent in the vertical plane parallel to their extension, providing for a span suitable for sloping terrain, and to allow them to swing slightly rearwardly and upwardly on striking an obstruction. The frameworks are articulated on horizontal axes to allow their outer sections to pivot upwards for transportation and storage. Loop portions of flexible spray line are included to allow the spray line to bend at these articulations.

In British Patent 1435999, booms which act as conduits of spray fluid extend either side of a trailer and are supported by wheels mounted on their outboard ends. The booms are articulated on vertical axes at several points along their lengths and at their join to the trailer. The sections of the spray booms are coupled at each articulation by flexible hose to allow the booms to be folded in parallel with the trailer in a compact storage mode.

British Patents 2110062 and 2149281 both disclose a boom assembly mounted at the rear or a vehicle with extended side sections pivotally connected to a central section directly behind the vehicle. The assembly is collapsed or folded by means of double-acting hydraulic rams connected between the side and centre sections pivoting the side sections inwardly and upwardly to a stored position. The spray fluid is conducted to each section by a flexible tube.

In British Patent 2100962, the booms are cantilevered latticework girders, made of resin and glass fibre, and articulated as a number of vertical axes. The spray fluid is conveyed through a flexible manifold mounted on each boom.

In West German Patent 3321615, a field spraying device is disclosed which has extended members in the form of metal trusses. The trusses support liquid lines leading to spaced spray nozzles. To enable the trusses to be collapsed for transportation and storage, they are articulated on vertical pivots, allowing the end portions to be folded in. At the articulation points, the liquid line passes from one portion of the trusses to the next by a length of flexible tubing. This patent relates specifically to a pivoting joint which surrounds and supports this flexible length so that it twists when the trusses are folded, but does not buckle, thus reducing wear. It has been found that this form of articulation to allow extended booms to be folded in is unnecessarily complex and limited in application.

It is also known in the art to enhance the efficiency of spraying plants by coupling an air blower to the spraying system to produce a stream of atomised spray fluid. This is particularly prevalent in applications such as spraying orchards when greater projection of spray fluid is required. Recently, the use of a forced-air mist of spray fluid has been found to be effective in spraying ground crops, especially those with dense foliage. Conventional spraying tends only to deliver spray fluid to the outer layer of foliage. When the spray fluid is carried by a stream of air, the air-blast agitates the foliage and forces the spray fluid to penetrate further. The combined effect of this agitation and the greater penetration is a considerably enhanced coverage of the entire crop, and this method particularly enhances penetration down to the base of the crop. Droplets of spray may also be swept back upwards from the ground level in the air turbulance to cover the underside of a crop's leaves.

In a known crop-spraying configuration of this type, a number of individual flexible air hoses lead from a central fan housing to spray nozzles spaced along extended booms. The spray nozzles are situated in the centre of circular air outlets at the end of each hose, so that fluid leaving the nozzles is atomised and enveloped within a conical air stream, producing the enhanced misting effect. In this configuration, it has been found that the connection of air hoses from the central air blower to the air outlets is unnecessarily complex, costly and cumbersome. The means of delivery of spray fluid into the air stream in this configuration can be unsuitable for ground crops. The use of flexible air hoses severely limits the air pressure which can be developed to assist spraying, and the volume of air passing through the outlets is unduly limited. It is also difficult or impossible to adjust the height of the spray outlets from the ground to cater for different heights and widths of crops.

This system does not provide an even distribution of spray across the width of the spray band. A circular spray pattern means that foliage in the centre of the spray band beneath the nozzle receives considerably more spray fluid than foliage on either side. As a circular spray passes across the ground, it is clear that the amount of spray delivered will fall off according to the transverse distance from the central longitudinal diameter of the circle. The effect of this is that foliage in the centre of each spray band may receive a wasteful excess of spray fluid, whereas foliage on either side may receive deficient amounts. Usage of spray fluid would clearly be optimised by a more even distribution of fluid across each band of spray.

Another such configuration has large flexible cylindrical air bags filled by a central air impeller and suspended from extended booms on either side of a support vehicle. Beneath the air bags are spray lines with spaced spray nozzles. Air outlets on the underside of the air bags allow a general downwards turbulent flow which carries the spray fluid with it. It has been found that the device is not of sufficiently sturdy construction. The air bag system is structurally inadequate and prone to wear, and does not allow for high air pressures. It is only suitable for producing a general downward flow in the form of a curtain of air. It cannot provide a controlled, directed air stream associated with each spray nozzle. The effect is to produce a broad, turbulent mist of spray which is unsuitable for crops with dense foliage and uneconomical and wasteful for crops in discrete, spaced rows.

According to the present invention, there is provided a crop spraying apparatus comprising:

an air impeller;

a central air chamber to receive air from the air impeller;

a pair of hollow rigid elongate air booms positioned either side of the air chamber and each communicating with the air chamber via a respective hollow joint, the hollow joints being adapted to allow the booms to swing between extended positions transverse to, and stored positions parallel to the forward direction of travel of the apparatus;

a plurality of air outlets along each boom;

a spray outlet means mounted on the boom adjacent each air outlet;

means for supplying spray liquid to each spray outlet means;

each hollow joint comprising a hollow cylindrical stem projecting upwardly from the air chamber, at least one radially extending annular location flange positioned adjacent the free end of the stem, the adjacent end of the boom terminating in a cylindrical end sleeve that is a running fit on the free end of the cylindrical stem, the end sleeve having at least one radially extending location flange that rests on the location flange of the stem for relative sliding movement via an intermediate packing layer to effect a substantially air tight seal;

whereby air impelled by the impeller into the air chamber passes through the joints, along the booms, and out of the air outlets to assist in the delivery of spray liquid from the spray outlets.

Preferably, the hollow joints are adapted to allow the booms to swing between extended positions transverse to, and stored positions parallel to the forward direction of travel of the apparatus, and to allow the booms to be set in intermediate positions between the extended and stored positions.

Each air outlet is preferably shaped to provide a directed air stream substantially normal to the extended booms, with a downwards and forward component.

In order that the present invention may be more fully understood, various embodiments of the invention will be described with reference to the accompanying drawings in which:

FIG. 1 is a general perspective view of a crop-spraying device in accordance with the invention;

FIG. 2 is a cross-sectional view along line II—II of FIG. 1;

FIG. 3*a* is a partial plan view of the device in FIG. 1 shown with booms in fully extended position;

FIG. 3*b* is a partial plan view of the device in FIG. 1 shown with booms in intermediate position;

FIG. 4 is a rear view of the device in FIG. 1;

FIG. 5 is a rear view of a second crop-spraying device in accordance with the invention;

FIG. 6 is a partial cross-sectional view of the right-hand joint of the first crop-spraying device along the line VI—VI in the direction indicated in FIG. 1;

FIG. 7 is a partial cross-sectional view of the right-hand joint of the second crop-spraying device, analogous to FIG. 6;

FIG. 8 is a side elevational view of one boom of a crop-spraying device constituting another embodiment of the invention;

FIGS. 9 and 10 are cross-sectional views of part of the boom of FIG. 8;

FIG. 11 is a side elevational view of part of a boom of a crop-spraying device constituting a further embodiment of the invention;

FIG. 12 is a cross-sectional view taken along the lines 12—12 of FIG. 11; and FIG. 13 is a similar cross-sectional view illustrating an alternative drive means.

Like reference numerals in the drawings indicate like components.

FIG. 1 shows the general configuration of a first crop-spraying device 10. The apparatus is mounted on a trailer 15 to be towed by a tractor in the direction indicated. A tank 11 for the spray fluid is connected to a pump 16 driven through a drive shaft 17 by the tractor's power take-off (not shown). Flexible reinforced rubber pipes 18 take the spray fluid from the pump 16 to a series of conventional spray nozzles 19.

At the rear of the trailer 15 is a tangential air impeller 12 of radius approximately 50 cm and with its downwardly directed outlet 21 directly connected to a central air distribution chamber 22 extending transversely across the width of the trailer 15. The centrifugal air impeller 12 is driven by a drive shaft (not shown) passing beneath the tank 11 and connected to the tractor's power take-off. Alternatively, the air impeller may be driven by a dedicated petrol motor. It has been found that in this embodiment approximately 50 h.p. is required to produce a desirable air flow at a pressure of approximately 25 inches (water gauge), with the air impeller blade running at approximately 3000 rpm. The chamber 22 has three air outlet ports 30, 31 and 32, the central outlet port 31 leading directly to a central air outlet duct 35, and the outlet ports 30 and 32 at either end of the chamber 22 leading to the extended air booms 13 and 14 via pivoting hollow joints 33 and 34. The air booms 13 and 14 carry a number of air outlet ducts 35. Each air outlet duct 35 has a flattened conical air funnel 36, with a spray nozzle 19 mounted on the upper flat face of each funnel 36.

The booms 13 and 14 are partially supported by struts 71 and 72 respectively, connected to cylindrical cups 73 and 74 which fit over cylindrical stems 75 and 76 so that the cups nay turn freely on the stems, thus allowing the struts 71 and 72 to swing in concert with the booms 13 and 14.

The booms 13 and 14 are swung on the joints 33 and 34 by means of double-acting hydraulic rams 80 and 81 pivotally connected both to the air chamber 22 and to extended legs 83 and 84 projecting from upper, pivoting portions of the joints 33 and 34.

When the rams 80 and 81 are connected to the tractor's hydraulic system (not shown), they can drive the booms 13 and 14 either individually or together to swing on the joints 33 and 34 between the fully extended spraying position shown in FIGS. 1 and 3a and a trailing, stowed position with the booms projecting rearwardly of the trailer. The stowed configuration enables the apparatus to pass through gates and narrow spaces and along public roads, and facilitates storage. The tractor operator can also swing the booms in this fashion to avoid obstacles in the path of the extended booms.

Moreover, the booms 13 and 14 may be set by the hydraulic rams at intermediate positions, at an acute angle to the fully extended position. FIG. 3b shows a typical intermediate setting.

A comparison of FIGS. 3a and 3b illustrates the use of such an intermediate setting. At the fully-extended position in FIG. 3a, the apparatus is adapted to spray a crop sown in rows the same distance apart as the spacing of spray nozzles and air outlets along the booms (dimension X in FIG. 3a). When the rams 80 and 81 are partially contracted, the booms 13 and 14 are set in an intermediate position such as is shown in FIG. 3b. The effective spacing of the spray nozzles is reduced as the boom is swung inward, according to the cosine of the angle of the boom's deflection from its fully extended position (so that dimension Y in FIG. 3b is equal to X multiplied by the cosine of the angle of deflection.) In this way, the operator can set the boom according to the row spacing of the crop to be sprayed. When the apparatus is to be used on crops sown various distances apart, it may be appropriate to provide for the wheelbase of the trailer 15 to be adjustable according to the spacing apart of crop rows.

The construction of the right-hand joint 34 is shown in detail in FIG. 6. The left-hand joint 33 is constructed analogously. A hollow cylindrical stem 30 leads upwards from the air outlet port 32 in the air distribution chamber 22. An annular flange 41 with an upturned edge 42 is fitted to the outside of the stem 30. The stem 30 terminates in a projecting rim 48.

An elbow section 50 leads from the air boom 14 to a cylindrical section 49 which fits tightly around the projecting rim 48 and is provided with an annular flange 43 corresponding with the first flange 41. An annular disc 44 fits over the top of the flange 43 and within the upturned edge 42. Intermediate packing layers in the form of fibreglass matting 45 and 46 are placed between the disc 44 and flange 43, and between flanges 43 and 41. These packing layers facilitate the movement of the flanges 43 relative to the flange 41 and disc 44. Bolts 47 pass through corresponding holes in disc 44 and flange 41 outside the circumference of flange 43, and nuts are screwed onto the bolts to hold the joint assembly 34 together. The nuts are tightened sufficiently to ensure structural rigidity and to minimise leakage of air through the joint, while allowing the central flange 43 to turn freely within the joint. The hollow construction allows air to pass through the joint from the air chamber 22 to the air boom 14, while the free movement of the flange 43 allows the boom 14 to swivel in a horizontal plane. Cylindrical spacers (not shown) may be positioned on the bolts 47 so as to turn freely and thus minimise any wearing effect of contact between the central turning flange 43 and the fixed bolts 47.

FIG. 2 illustrates the atomising effect of the spray of fluid meeting the forced air stream from an air outlet 35. The flattened funnel of the outlet projects downwardly and forwardly in a plane normal to the extended position of the boom. The spray nozzle 19 is mounted on the flat upper face of the air funnel. A spray nozzle is selected to provide an even fan-shaped spray subtending an angle of 110°. In an alternative configuration, a spray nozzle is used which produces a fan spray of 80°.

A stream of air passing from the air boom leaves the outlet funnel in a directed downward and forward flow with sufficient pressure to agitate the crop's foliage and to penetrate to the base of the crop. The introduction of the spray of fluid into the air stream from above maximises the amount of spray carried by the directed air stream to ensure that the spray fluid fully penetrates the crop. The combination of the fan-shaped spray of fluid with the air stream created by the outlet funnel 36 provides a broad spray of fluid of even distribution across its width.

In a preferred construction (not shown in drawings) the air outlet funnel 36 can be detached from the air outlet duct 35, and a cylindrical extension member inserted to bring the outlet funnel 36 and its associated spray nozzle 19 closer to the ground. This provides for a narrower band of spray fluid, and allows for an economical use of fluid particularly when crops are young, being small in size and close to the ground. Extensions may be provided in various lengths to enable a range of spray band widths to be covered by the one spraying apparatus. Alternatively, an extension facility is provided by including telescoping segments of the outlet duct 35 which can be set at various extensions by wing-nuts or similar fasteners.

In one spraying apparatus suitable for use on rockmelons, extensions are used to position the tip of the air funnel 36 30 cm from the ground when the rockmelons are small, affording a spray bandwidth of 60 cm for rows of melons 2 m apart, with the greatest width of the outlet funnel 36 approximately 6-7 cm. When no extensions are used, the tip of the air outlet is approximately 115 cm from the ground, affording a full spray bandwidth of 2 m for the mature crop.

If it is desired to spray broader spacing between rows of crops, it is possible to blank off alternate air and spray fluid outlets. Further flexibility for this construction flows from the ease of substitution of various booms with different air outlet spacings, configurations, lengths and diameters. One prototype spraying apparatus of this configuration spans 14 m with booms made of 8" steel pipe. This configuration could be used to span from 16 m to 20 m, and the booms may be tapered toward their extremities to increase the possible span.

This configuration allows for a robust, simple and trouble free steel construction, and allows for very high internal air pressures in contrast to the prior art constructions, which are only suitable for low working air pressures. The atomised mist can be projected further, with more penetrating power and directional stability, when higher air pressures can be used.

An alternative crop-spraying device in accordance with the present invention is shown in FIGS. 5 and 7. This configuration allows for broader boom spans through enhanced support of the extended booms. The overall construction of this alternative device is similar to that of the first device described above, essentially with the exception of the boom support means and the hollow joint construction.

FIG. 5 shows the rear of the trailer 15 on which is mounted a support structure comprising hollow stems 90 and 91 connected by a bracing member 93 supported by struts 94. Collars 97 are mounted on the stems 90 and 91 so as to turn freely and are fixed at a suitable height to provide appropriate triangulation points for attachment of support lines 98. The support lines 98 run between the collars 97 and the ends of the booms. The lines 98 include turnbuckles 99 to adjust their tension and hence the support they provide for the booms. Although in FIG. 5, the lines 98 are shown attached to lugs at the ends of the booms, the lines 98 may preferably run to supporting points intermediate along the booms, with the tips of the booms being cantilevered from the intermediate supporting points.

FIG. 7 shows the detailed construction of the right-hand hollow pivoting joint connecting the air chamber 22 to the booms 14 in this second configuration. The left-hand joint is constructed analogously. A shank 96 fits tightly over the stem 91 so as to turn freely. The boom 14 is connected to the shank 96, defining an opening 101 through the wall of the shank 96. A corresponding aperture 102 is formed in the wall of the stem 91 so as to form a continuous passage between the interior of the stem 91 and the interior of the boom 14 when the boom 14 is set in its extended or desired intermediate positions.

The stem 91 may have an annular flange 103 on which rests a corresponding flange 104 on the shank 96. An intermediate layer of fibreglass matting 105 sits between the flanges to facilitate their relative turning. Similar flanges 106 and 107 are provided respectively on the top edge of the shank and the adjacent portion of the stem to prevent the shank rising up on the stem.

Instead of support lines 98, each boom 13 and 14 may be supported in this configuration by a cantilevered webbed truss, structurally incorporating the collar 97 and the shank 96.

In all other respects, this configuration is similar to the first configuration described. It is to be understood that the foregoing description is put forward by way of example only and the definition of the invention should not be limited thereby.

In the embodiment of FIGS. 8 to 11, each boom 13, 14 is supported by a truss 120 comprising an elongate spa 121 attached via a collar 122 to the free end of the boom 13, 14 and an annular flange 125 that forms part of an outer sleeve 126 that is a sliding fit on a vertical pillar 127 from which the boom 13, 14 projects. The truss 120 is further reinforced by strengthening bars 130 that support the boom 13, 14 via collars 131. The comparatively compact truss allows a long boom to project from each side of the central impeller 12. The outer sleeve 126 is coupled to a hydraulic piston and cylinder assembly 135 that acts as a lifting cylinder to cause the height of the whole boom to be adjustable. Two extremes of the vertical adjustability are shown in FIGS. 9 and 10. In FIG. 9, the boom 13 is shown in the down position with the air flowing out of a cut-out 140 in the base of the vertical column 127 and into the entry of the boom. When the lifting cylinder 135 moves the boom to the upper position shown in FIG. 10, the air flow to the boom is via an upper portion 141 of the cut-out in the column 127. The vertical adjustability of the booms allow the sprayer to be used on a greater variety of crops and improves the versatility of the unit.

In the embodiment shown in FIGS. 11 to 13, each boom 13, 14 is provided with a capacity for the boom to rotate about its longitudinal axis thereby effectively varying the inclination of the spray nozzles 19 to the ground. This feature is particularly important where the sprayer is being used in high winds. The inclination of the nozzles can be varied from a forward facing inclination through a vertical inclination to a trailing inclination.

FIG. 11 illustrates a boom construction similar to the embodiment of FIGS. 1 and 4. However, in the embodiment of FIG. 11, the boom 13 is in two sections, namely a first curved section 150 and an elongate arm section 151. The arm section 151 is attached to the curved section 150 in a manner that it can axially rotate relative to the curved section 150. This feature is provided by causing the ends of the respective sections to fit one within the other so that one is a smooth running fit on the other. Suitable bearings may be incorporated into the assembly to assist the rotatability. Alternative ways of driving the boom sections are illustrated in FIGS. 12 and 13. In FIG. 12, a radial arm 160 is provided on the fixed outer curved section 150 and the free end of this arm is coupled to a radial arm 161 that extends from the arm section 101. A hydraulic piston and cylinder 162 interconnects the arms 160 and 161 so that actuation of the piston cylinder causes the arms to move between the full line and dotted positions shown in FIG. 12. The variation of the inclination of the spray nozzles is again as shown in FIG. 12.

In the form illustrated in FIG. 13, an arcuate geared rack 170 is positioned between two radially extending arms 171, 172 of the arm section 151. This rack 170 is arranged to mesh with a worm gear 173 supported by the curved section 100. An electric or hydraulic motor (not shown) is arranged to drive the worm gear 173 to move the arm section 151 through the positions shown in full line and dotted line in FIG. 13.

It is understood that the feature of axial rotatability can also be applied to the embodiment shown in FIGS. 8 to 11.

Having described my invention what I claim is:

1. A crop spraying apparatus comprising:
   an air impeller;
   a central air chamber to receive air from the air impeller;
   a pair of hollow rigid elongate air booms positioned either side of the air chamber, each air boom having adjustable vertical height, and each having an adjacent end communicating with the air chamber via a respective hollow joint, the hollow joints being adapted to allow the booms to swing between extended positions transverse to, and stored positions parallel to the forward direction of travel of the apparatus:
   a plurality of air outlets along each boom;
   a spray outlet means mounted on the boom adjacent each air outlet;
   means for supplying spray liquid to each spray outlet means;
   each hollow joint comprising a hollow cylindrical stem projecting upwardly from the air chamber, the stem terminating in a free end, at least one radially extending annular location flange positioned adjacent the free end of the stem, the adjacent end of the boom terminating in a cylindrical end sleeve that is a running fit on the free end of the cylindrical stem, the end sleeve having at least one radially extending location flange that rests on the location flange of the stem for relative sliding movement via an intermediate packing layer to effect a substantially air tight seal;

whereby air impelled by the impeller into the air chamber passes through the joints, along the booms, and out of the air outlets to assist in the delivery of spray liquid from the spray outlets.

2. A crop-spraying apparatus according to claim 1 wherein each boom extends laterally from a sleeve member mounted co-axially on a central column, a truss interconnecting the boom with the sleeve.

3. The crop-spraying apparatus according to claim 2 wherein a lifting cylinder is positioned between the sleeve and the central column to raise or lower the boom.

4. A crop-spraying apparatus comprising:
an air impeller;
a central air chamber to receive air from the air impeller;
a pair of hollow air booms positioned either side of the air chamber and each communicating with the air chamber via a respective hollow joint;
a plurality of air outlets along each boom;
a spray outlet associated with each air outlet;
and means for supplying spray fluid to each spray outlet;
means to vary the vertical height of each air boom;
whereby air impelled by the impeller into the air chamber passes through the joints, along the booms, and out the air outlets to assist in the delivery of spray fluid from the spray outlets.

5. A crop spraying apparatus comprising:
an air impeller;
a central air chamber to receive air from the air impeller;
a pair of hollow rigid elongate air booms positioned either side of the air chamber, each air boom having adjustable vertical height and comprising first and second sections coupled together such that the first section can axially rotate relative to the second section and vice versa, and each having an adjacent end communicating with the air chamber via a respective hollow joint, the hollow joints being adapted to allow the booms to swing between extended positions transverse to, and stored positions parallel to the forward direction of travel of the apparatus;
a plurality of air outlets along each boom;
a spray outlet means mounted on the boom adjacent each air outlet;
means for supplying spray liquid to each spray outlet means;
drive means for axially rotating the first and second sections of each air boom to vary the inclination of the spray outlet means, said drive means comprising an arcuate rack driven by a worm gear, which is in turn driven by an electric/hydraulic motor;
each hollow joint comprising a hollow cylindrical stem projecting upwardly from the air chamber, the stem terminating in a free end, at least one radially extending annular location flange positioned adjacent the free end of the stem, the adjacent end of the boom terminating in a cylindrical end sleeve that is a running fit on the free end of the cylindrical stem, the end sleeve having at least one radially extending location flange that rests on the location flange of the stem for relative sliding movement via an intermediate packing layer to effect a substantially air tight seal;

whereby air impelled by the impeller into the air chamber passes through the joints, along the booms, and out of the air outlets to assist in the delivery of spray liquid from the spray outlets.

6. A crop spraying apparatus comprising:
an air impeller;
a central air chamber to receive air from the air impeller;
a pair of hollow rigid elongate air booms positioned either side of the air chamber, each air boom having adjustable vertical height and comprising first and second sections coupled together such that the first section can axially rotate relative to the second section and vice versa, and each having an adjacent end communicating with the air chamber via a respective hollow joint, the hollow joints being adapted to allow the booms to swing between extending positions transverse to, and stored positions parallel to the forward direction of travel of the apparatus;
a plurality of air outlets along each boom;
a spray outlet means mounted on the boom adjacent each air outlet;
means for supplying spray liquid to each spray outlet means;
drive means for axially rotating the first and second sections of each air boom to vary the inclination of the spray outlet mean, said driven means comprising an hydraulic cylinder positioned between radially extending arms extending from said first and second boom sections;
each hollow joint comprising a hollow cylindrical stem projecting upwardly from the air chamber, the stem terminating in a free end, at least one radially extending annular location flange positioned adjacent the free end of the stem, the adjacent end of the boom terminating in a cylindrical end sleeve that is a running fit on the free end of the cylndrical stem, the end sleeve having at least one radially extending location flange that rests on the location flange of the stem for relative sliding movement via an intermediate packing layer to effect a substantially air tight seal;

whereby air impelled by the impeller into the air chamber passes through the joints, along the booms, and out of the air outlets to assist in the delivery of spray liquid from the spray outlets.

* * * * *

UNITED STATES PATENT AND TRADEMARK OFFICE
CERTIFICATE OF CORRECTION

PATENT NO. : 5,176,322
DATED : January 5, 1993
INVENTOR(S) : Giuseppe M. Sartor

It is certified that error appears in the above-indentified patent and that said Letters Patent is hereby corrected as shown below:

Column 10, line 32 (claim 6), "extending" should be --extended--.

Column 10, line 42 (claim 6), "mean" should be --means--.

Column 10, line 42 (claim 6), "driven" should be --drive--.

Column 10, line 53 (claim 6), "cylndrical" should be --cylindrical--.

Signed and Sealed this

Seventh Day of December, 1993

Attest:

BRUCE LEHMAN

Attesting Officer     Commissioner of Patents and Trademarks